Feb. 3, 1959

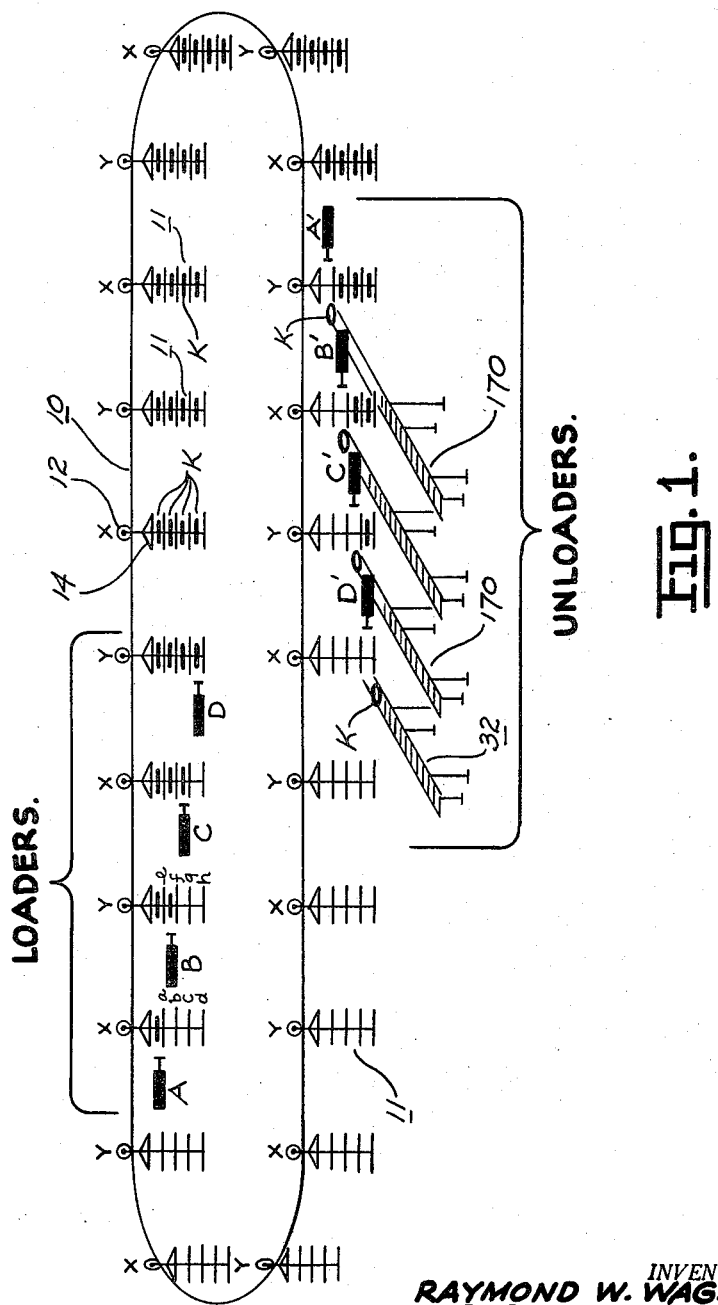

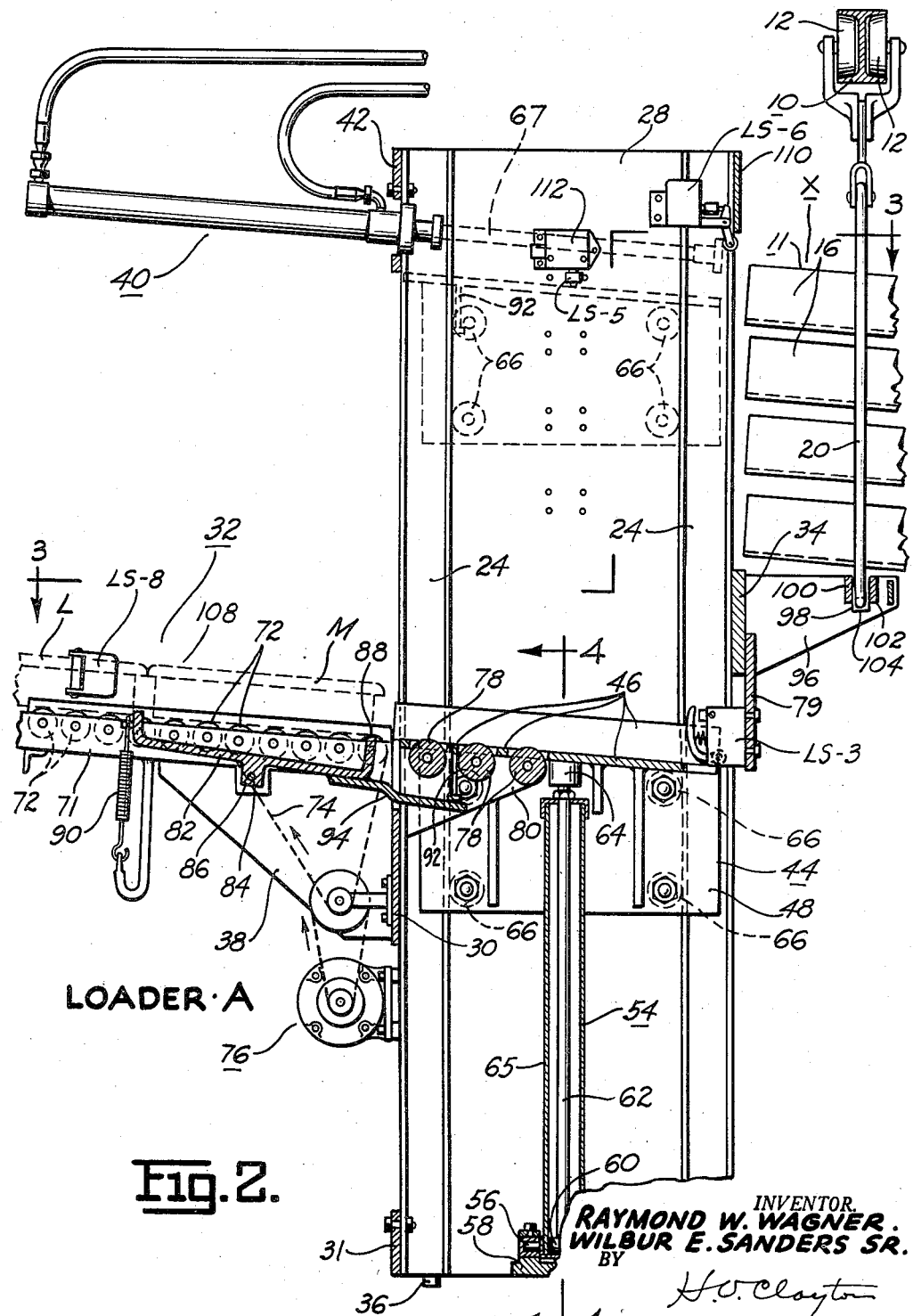

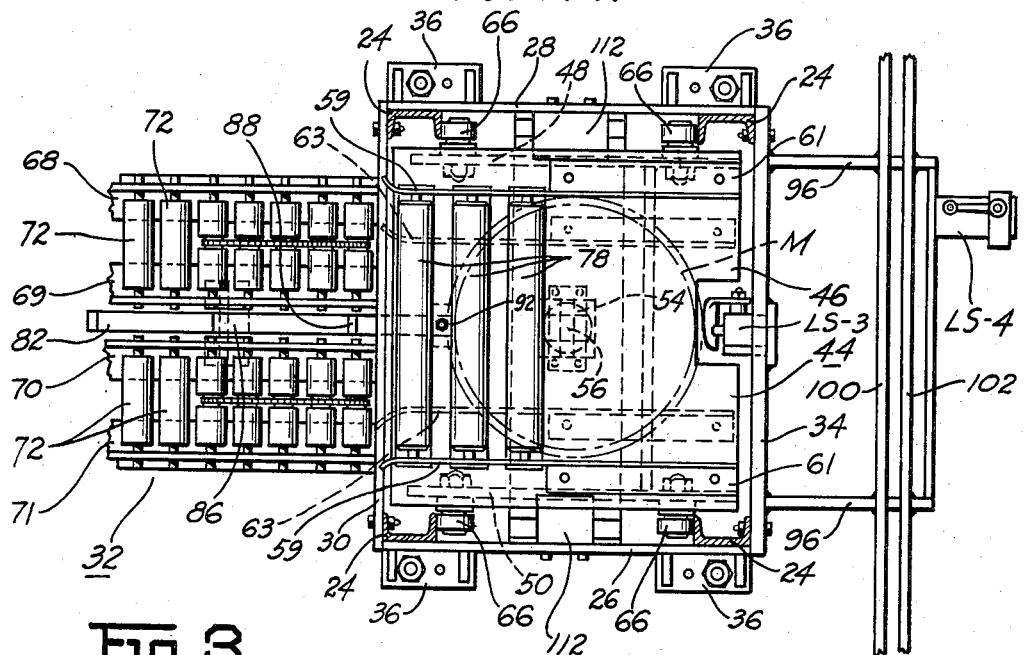
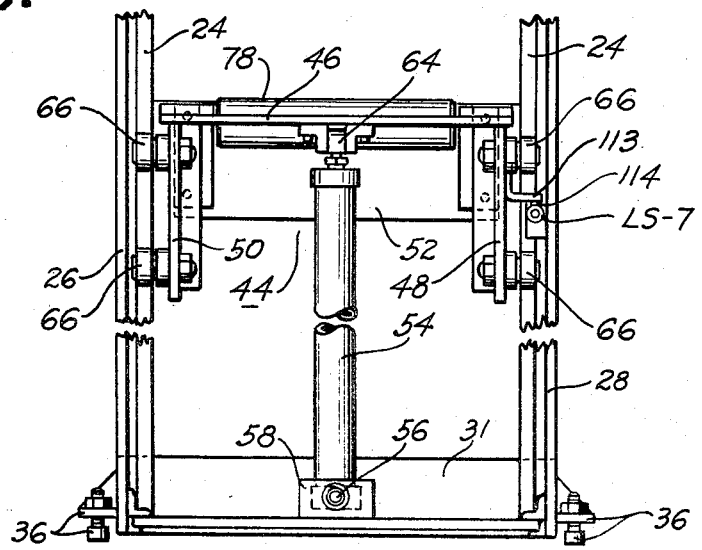

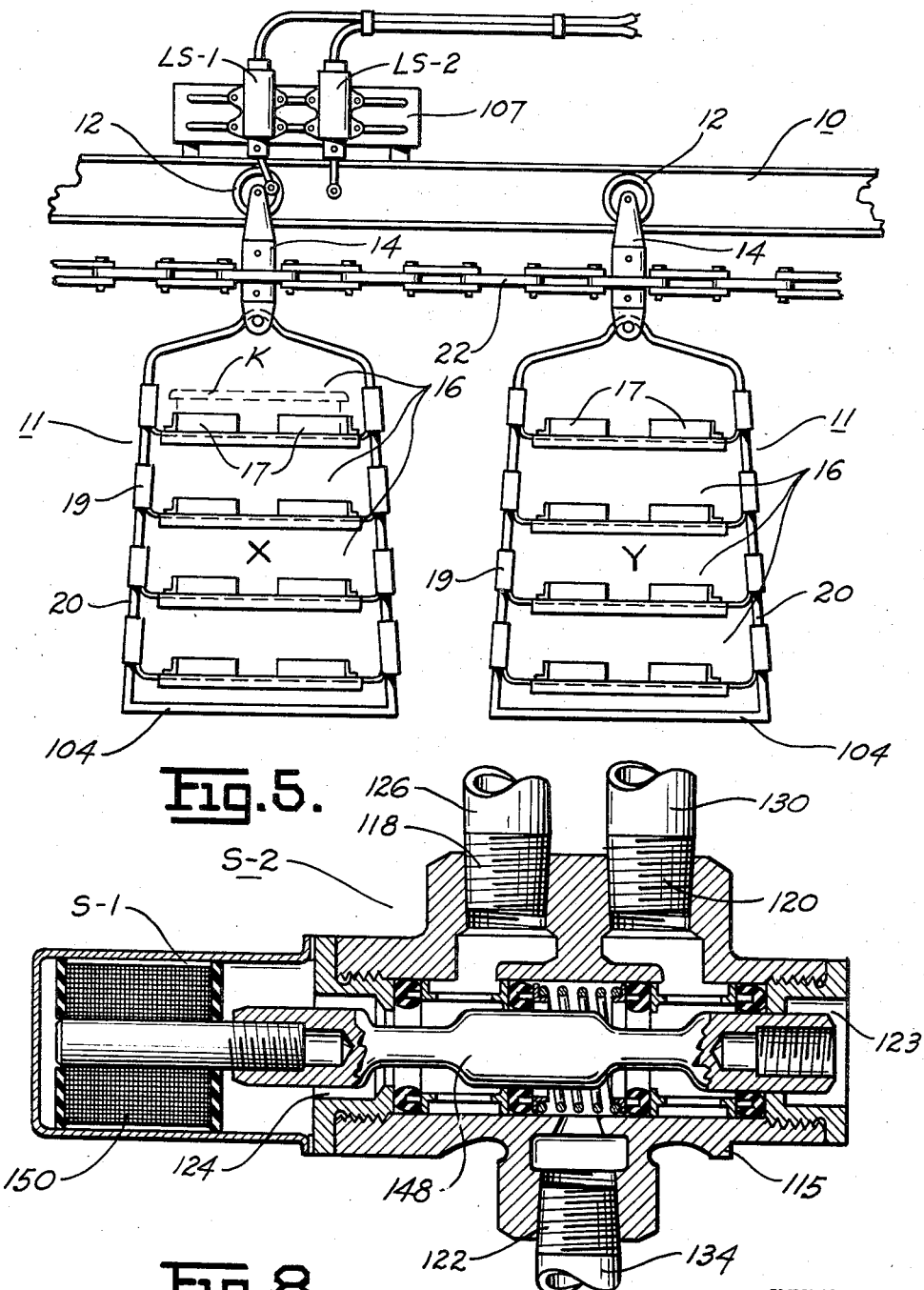

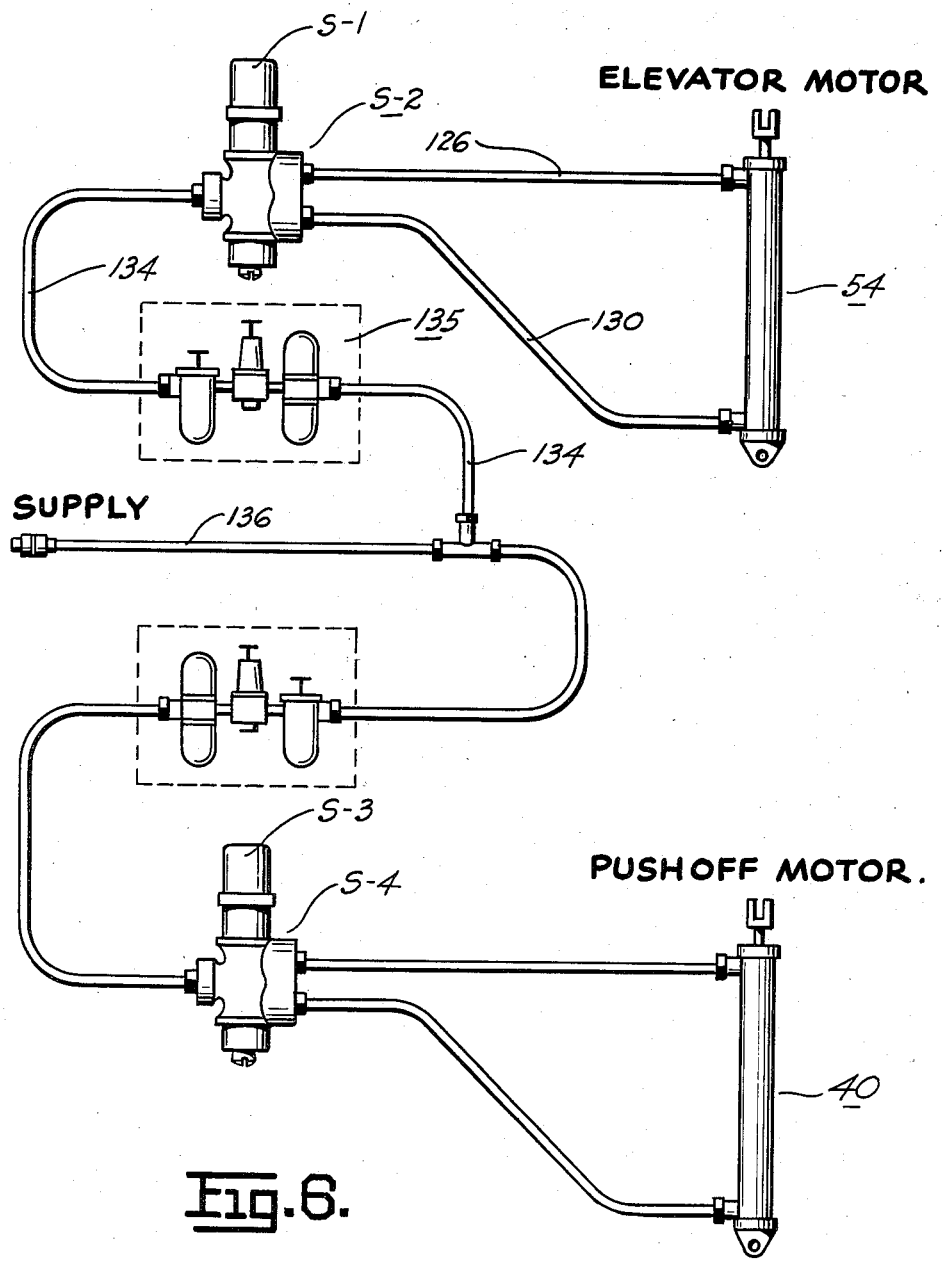

R. W. WAGNER ET AL 2,872,057

LOADER, UNLOADER MECHANISM

Filed June 27, 1956

INVENTOR.
RAYMOND W. WAGNER
WILBUR E. SANDERS SR.
BY
H. O. Clayton

ATTORNEY.

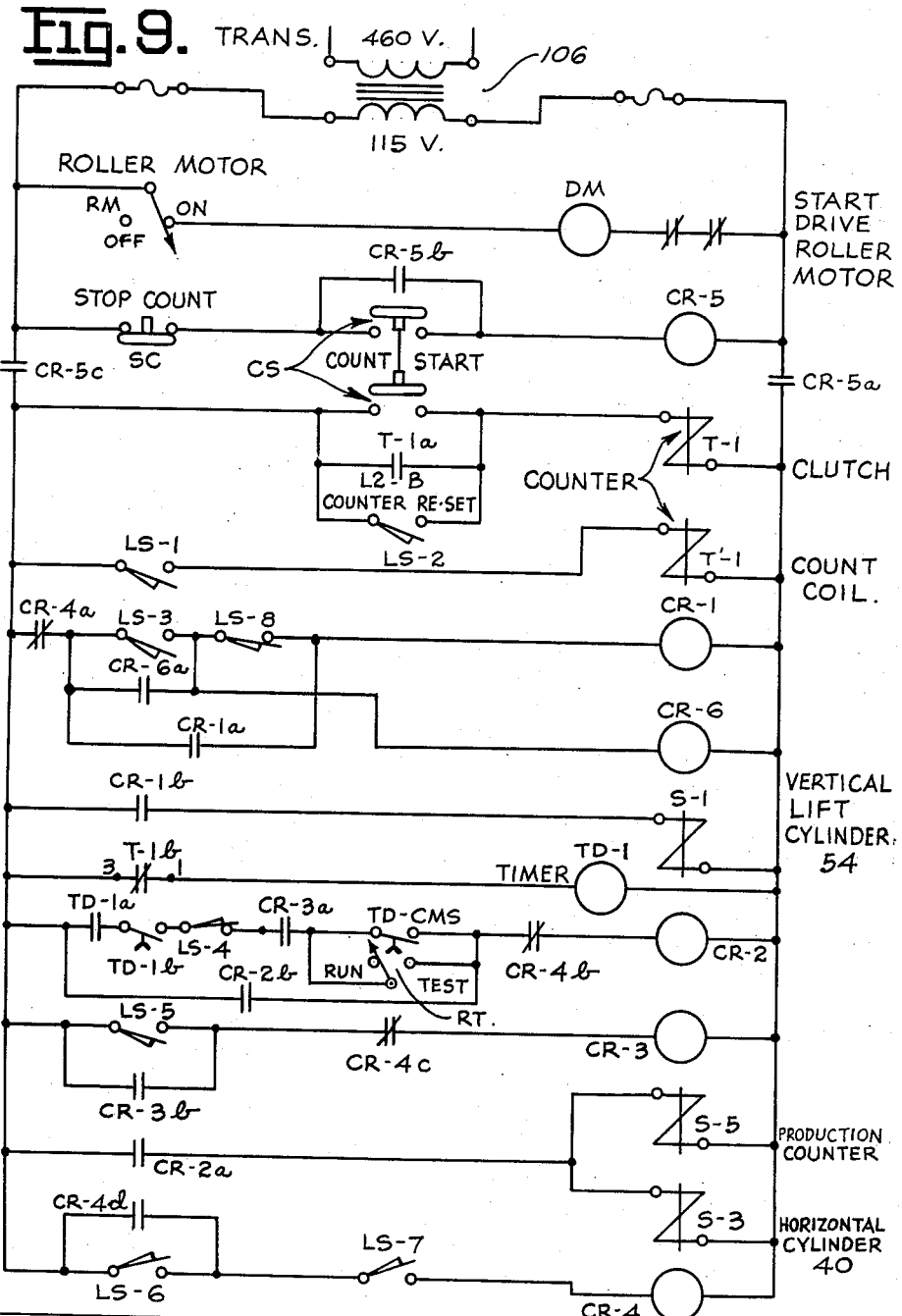

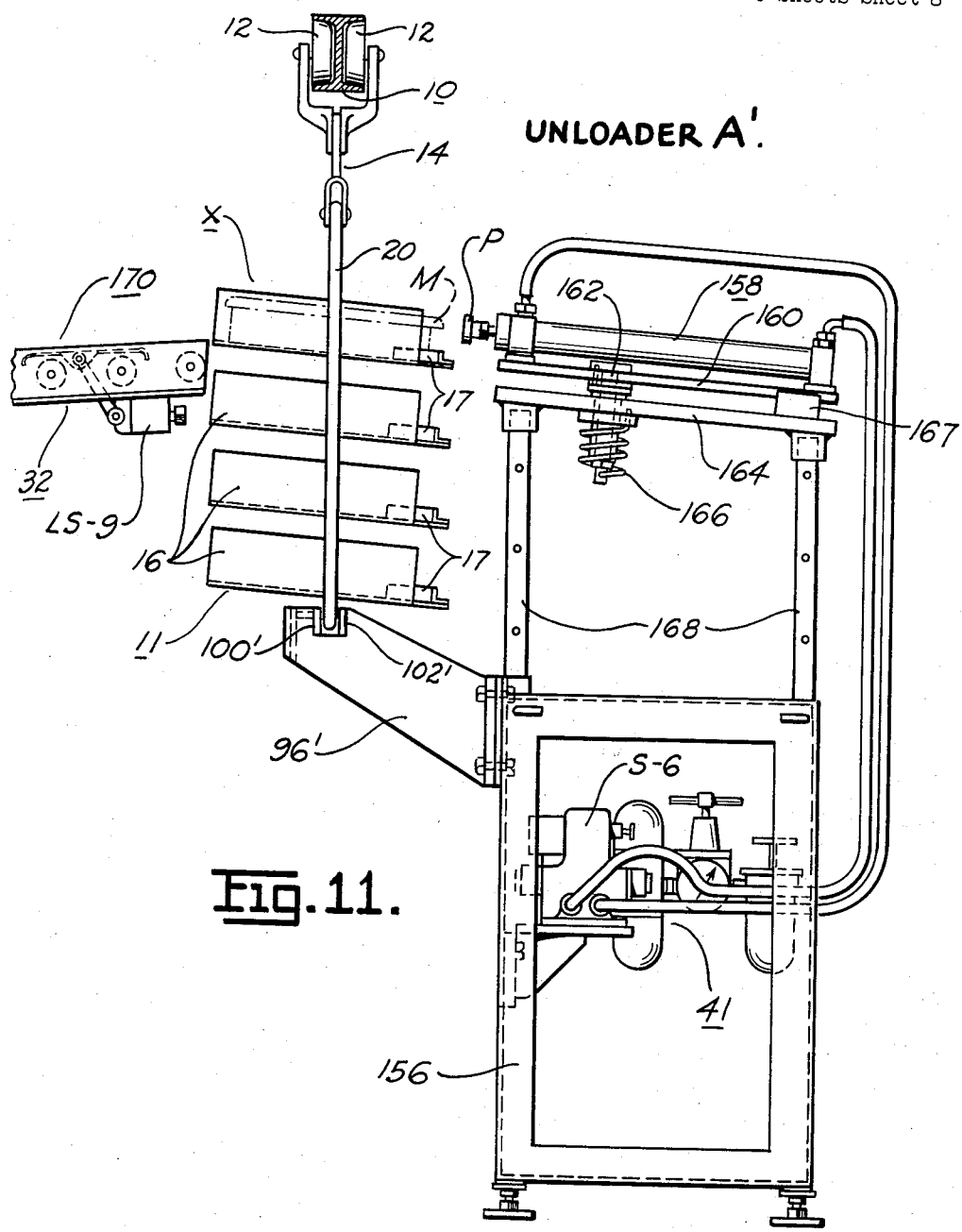

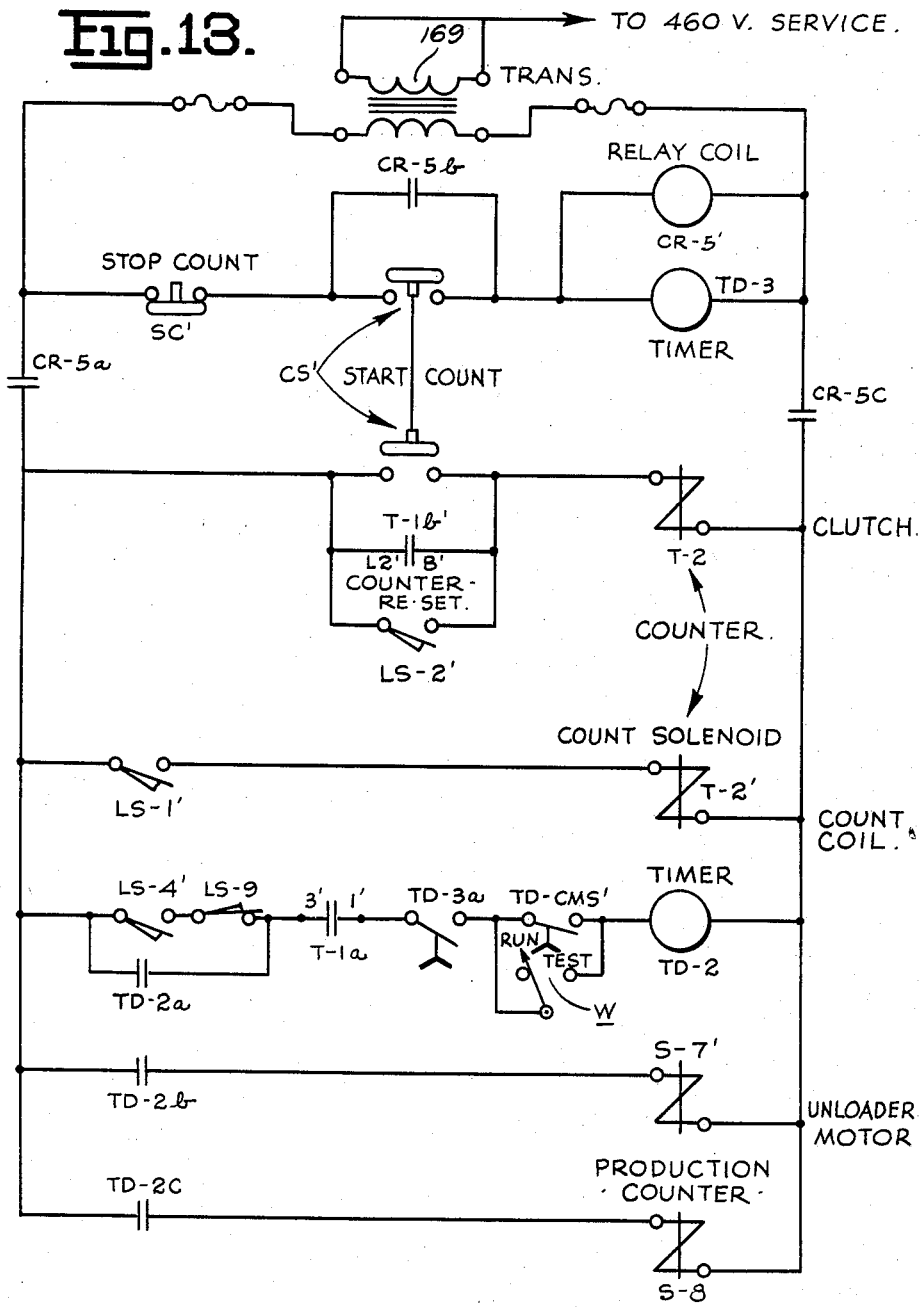

United States Patent Office 2,872,057
Patented Feb. 3, 1959

2,872,057

LOADER, UNLOADER MECHANISM

Raymond W. Wagner and Wilbur E. Sanders, Sr., South Bend, Ind., assignors to Bendix Aviation Corporation, South Bend, Ind., a corporation of Delaware Application June 27, 1956, Serial No. 594,306

12 Claims. (Cl. 214—89)

This invention relates in general to means for selectively loading and unloading powered conveyors and in particular to a means of this type for transporting a plurality of different units, such as several types of automobile brakes, from one part of a manufacturing plant to another part of said plant, there to be disposed of as desired.

There is a need in this art for automatically operated mechanism operable to load a conveyor with a plurality of types of products said products being then conveyed to unloader mechanism which selects and deposits the product at a desired station. The mechanism of our invention, hereinafter described in this specification, meets this need for with said mechanism a plurality of types of brakes or other units there being a plurality of units of each of said types, are selectively loaded on a conveyor, and then transported to another place there to be selectively unloaded and deposited at the desired stations.

Another object of our invention is to provide a plurality of loader mechanisms together with corresponding unloader mechanisms said mechanisms being cooperable with a single conveyor system, said system comprising an endless conveyor carrying a plurality of carrier units.

Yet another object of our invention is to provide a mechanism for sequentially loading a plurality of different units upon a conveyor mechanism, said operation being effected in a certain area or areas of a manufacturing plant, then conveying said units to the same or other areas of said plant and there, in a certain sequence, unloading the units.

Our invention also contemplates the provision of a loader, conveyor, unloader mechanism including a conveyor mechanism comprising a number of carrier units said number being a multiple of a certain number, said conveyor mechanism cooperating with one or more loader units and a corresponding number of unloader units.

Another object of our invention is to provide, in combination with a power driven conveyor mechanism having a plurality of chain driven carrier units, a relatively simple power operated mechanism for loading a plurality of types of units onto said carrier units, together with a relatively simple power operated unloader mechanism for, in a desired sequence, removing said units from the trolley units.

An important object of the present invention is to so construct a mechanism for the present purposes as to make possible the attainment of all of the results hereinbefore specified, as well as other results which will appear from a study of the following specification.

An object of our invention is, generally speaking, to provide a mechanism of the aforementioned type which shall be automatic in its entire operation and require no duty on the part of the attendant beyond placing work, such as an automobile brake or other unit, upon a suitable work carrier by which the work is fed into the mechanism; or if desired the work may be machine fed to the mechanism.

Another object of our invention is to provide a relatively simple automatically operable mechanism for accurately and expeditiously transporting a plurality of different units, such as a plurality of types of automobile brakes or a plurality of airplane parts, from one area of a manufacturing plant to another area of said plant and there deposit all units of each different type in a receptacle such as a carton or its equivalent there being, of course, a receptacle for each type unit.

Yet another object of our invention is to provide a mechanism of the above mentioned character which is accurate and reliable in operation.

Yet another object of our invention is to provide a mechanism of the class referred to which is so constructed as to operate rapidly and efficiently with a minimum possibility of damage being done to the parts of the mechanism, and requiring a minimum of attention by the operator in charge.

A further object of our invention is to provide a loader, conveyor, unloader mechanism wherein a conveyor, including a certain number of carrier units, cooperates with a plurality of loaders and a plurality of unloaders each loader, or a plurality of said loaders, and each unloader, or a plurality of said unloaders, handling a different type of unit to be conveyed, the loaders and unloaders being so constructed and the number of carrier units, a multiple of a certain number, being such that the units are loaded onto the conveyor mechanism in a certain sequence there being a plurality of said sequences.

Another object of our invention is to provide, in a conveyor mechanism adapted to transport a plurality of different devices from a loading area in a factory to a remotely located unloading area, a plurality of carriers each comprising a plurality of work receiving trays spaced one from the other in the vertical plane of the carrier.

Yet another object of our invention is to provide a loader, unloader, conveyor mechanism comprising a plurality of movable carriers which cooperate with a plurality of loader units grouped together in a relatively small area and all located on a certain side of the carriers; and it is a further object of our invention to include in said mechanism, a plurality of unloader units which are also grouped together in a relatively small area and which are all located on a certain side of the carriers.

A further object of our invention is to provide a loader, unloader, conveyor mechanism including an endless movable conveyor in combination with a plurality of spaced stationary loader units positioned within a relatively small area and a plurality of spaced stationary unloader units also positioned within a relatively small area, said loader units being operative, in a sequence of operations, to push devices to be loaded onto carrier units mounted on the conveyor and movable past the loader units and said unloader units being operative, in said sequence, to push said devices off of said carrier units.

Our invention also contemplates the provision of a relatively small, compact and effective power operated loader unit comprising a work lifting elevator fed by a work receiving chute mechanism, said elevator being operative to lift work units to a certain elevation said units being then pushed off of the elevator by a pressure differential operated double-acting motor.

A further object of our invention is to provide a power operated unloader mechanism including a double-acting pressure differential operated motor operable, at a certain time, to push work units off of a carrier unit.

Yet another object of our invention is to provide an electropneumatic mechanism for controlling the operation of a loader, unloader, and conveyor mechanism said electropneumatic mechanism including means operative, successively, to lift, to a desired height, an elevator with a workpiece laid thereon, force said workpiece off of the elevator by the operation of the piston of a double-acting pressure differential operated motor, then return said piston to its off position and return the elevator to its lowered position, and then again load the elevator with another workpiece; and said electropneumatic mechanism also includes means, including a pressure differential operated double-acting motor, for forcing the workpieces off of the carriers of said loader, unloader conveyor mechanism.

Other objects and advantages of the present invention will become apparent during the following description of one embodiment of our invention, reference being had therein to the accompanying drawings, in which:

Figure 1 is a view disclosing, in a diagrammatic manner, the principal features of our invention;

Figure 2 is a side elevational view, of the loader mechanism partly in section and the electrical controls being omitted, of the loader mechanism of our invention; and this view also discloses portions of a carrier and a portion of the conveyor mechanism;

Figure 3 is a sectional view, taken on the line 3—3 of Figure 2, disclosing certain details of the loader mechanism;

Figure 4 is a sectional view, taken on the line 4—4 of Figure 2, disclosing other details of the loader mechanism;

Figure 5 is a view disclosing a portion of the conveyor and carrier mechanism of our invention; and this view also discloses a part of the electrical controls of the loader mechanism;

Figure 6 is a diagrammatic view disclosing the two identical double-acting pressure differential operated motors of the loader mechanism together with their control valves which are identical;

Figure 8 is a sectional view of the control valve of Figures 6 and 7, the valve being disclosed in its off position;

Figure 9 is a view disclosing the electrical hookup of the electrical controls of the loader mechanism;

Figure 12:
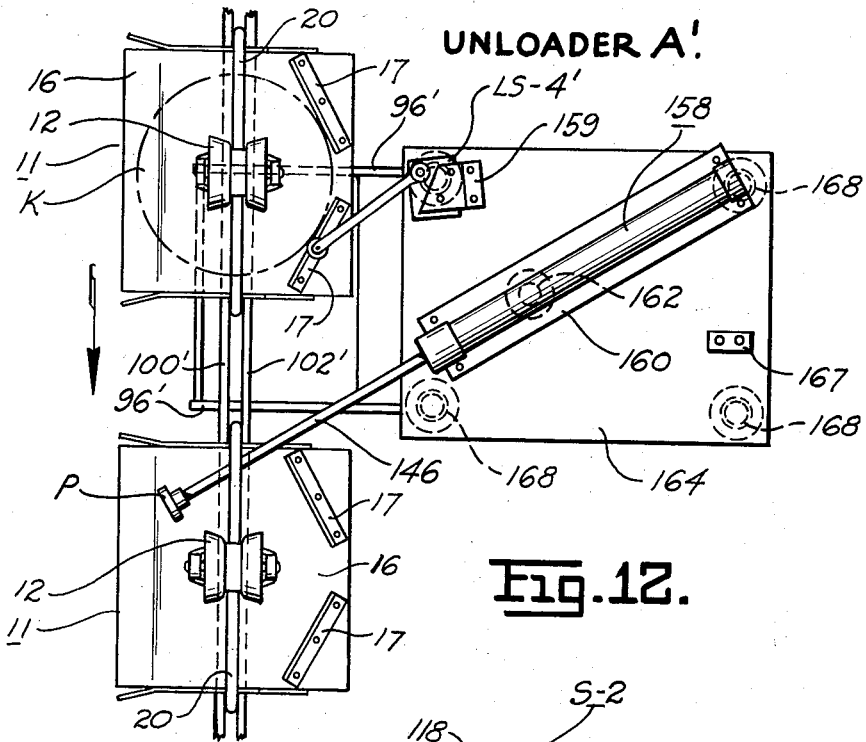

Figure 10 discloses a chart indicating the several switches of the counter of the loader mechanism;

Figure 11 is a side elevational view, together with one of the carriers and a portion of a chute, of the unloader mechanism of our invention, the electrical controls being omitted;

Figure 12 is a view, looking down upon the unloader mechanism of our invention, disclosing details of said mechanism;

Figure 13 is a view disclosing the electrical hookup of the electrical controls of the unloader mechanism; and Figure 14 is a chart similar to Figure 10, disclosing the switches of the counter of the unloader mechanism.

Referring now to the several figures of the drawings disclosing a preferred embodiment of our invention there is diagrammatically disclosed in Figure 1 a loader, unloader and conveyor mechanism. The conveyor system of this mechanism preferably includes an endless elliptically shaped I-beam track 10 which serves as a support for a plurality, preferably a multiple of two or more, of equally or substantially equally spaced carrier units 11 each comprising a roller 12 to which is pivotally secured a four-part hanger 14, and further comprising a multi-tray unit 16 secured to the lower end of the hanger. The several carrier units are identical and two of them are disclosed in Figure 5. Each of the units 16 preferably comprises four trays positioned one above the other as disclosed in Figure 5. Each of the four trays includes diagonally extending spaced stops 17 mounted on one side of the tray and operating to position a work unit such as a brake disclosed in dotted lines in the latter figure; and each tray may be secured in place by keepers 19 which are secured to an endless rectangular shaped bar 20 mounted on the hanger 14. The carrier units 11 are preferably moved around the track 10 by a power operated endless chain 22, Figure 5, the hanger 14 of each unit extending through said chain. The brake units as a whole are indicated by the reference letter K in Figure 1.

Referring again to the diagrammatic showing in Figure 1, this figure discloses the loader and unloader mechanism of our invention those of the loaders shown being indicated by the capital letters A to D inclusive; and corresponding unloader units are indicated by capital letters A' to D' inclusive. We prefer to use eight loaders and eight unloaders in the mechanism of our invention, the loaders being positioned side-by-side in a relatively small area; and the side-by-side unloaders being located in a relatively small area remote from the loaders. Only four loader units and four unloader units are disclosed in Figure 1 inasmuch as to disclose all eight of each would clutter up the figure.

Each of the loaders and unloaders in Figure 1 handles a particular type of work unit being processed such as a particular type of automobile brake or other unit such as a container of some sort; and each of the loaders and unloaders is positioned in Figure 1 opposite a carrier said carriers being indicated alternately by the letters X and Y. The loader A, for example, will load a Ford brake onto carrier X, said carrier being one of a sequence of two carriers passing this particular loader; and loader B will load say a Chevrolet brake on carrier Y which is the second carrier of this one two sequence of carriers of Figure 1. The loaders C and D of Figure 1 will, with the mechanism operating on a sequence of two, successively load say Plymouth and Pontiac brakes upon the carriers; two other loaders, not shown, will successively load say Hudson and Packard brakes; and the remaining two loaders, not shown, will successively load say Cadillac and Oldsmobile brakes. Each of the aforementioned types of brakes is loaded onto a certain one of the eight trays in operation the trays of each carrier being at a different height. There is, therefore, with the mechanism of that embodiment of our invention disclosed in Figure 1, means for sequentially loading and unloading eight different brakes; furthermore, since there is, in this embodiment, a multiple of two four-tray carriers cooperating with eight loading stations and eight unloading stations, it follows that there are four different two sequence loading operations, two different brakes for each of said operations. There are also, of course, four different two-sequence unloading operations there being two different brakes for each of said operations.

It is to be noted that the mechanism of our invention is not limited to the particular sequence described here for there may, for example, be carriers X, Y and Z, that is a sequence of three; nor is the mechanism limited to the type of unit processed, that is loaded upon the conveyor and then unloaded. When there are eight loader units and eight corresponding unloader units each unit operating on a sequence of two, then there must, of course, be eight different trays provided, four on the carrier X and four on the carrier Y. Accordingly, these eight trays are indicated by the letters a to h inclusive in Figure 1.

The endless conveyor of our invention may be located in a manufacturing plant or other building; or it may be located out of doors, there being no limitation as to the length of the conveyor, where it may be located, and what it may convey provided, of course, the particular work units being processed may, with facility, be pushed onto and off the trays of the carriers. The group of loaders are of course remote from the group of unloaders. In the embodiment of our invention disclosed in this application a plurality of types of automobile brakes are processed; and the particular loading mechanism and unloading mechanism, both constituting important features of our invention, are constructed and operative to load several types of automobile brakes upon a conveyor and then unload said brakes as desired.

Enlarging upon the above discussed sequence feature of our invention, to insure the desired efficiency and effectiveness of the mechanism, particularly the desired unloading of the units transported, the conveyor mechanism includes a certain number of carrier units said number being a multiple of a certain number. Explaining the fact that the number of carriers is a multiple of a certain number, if there are say two or a multiple of two types of automobile brakes to be loaded and unloaded in sequence on certain trays of the carriers, then the total number of carrier units is a multiple of the number two as is disclosed in Figure 1, there being twenty-two carriers shown in this figure.

Loader mechanism

Describing now the loader mechanism of our invention disclosed in detail in Figures 2, 3 and 4, four channel shaped members 24, Figures 2, 3 and 4 constitute the principal supports of a boxlike structure constituting the framework of the loader. To these members there are fixedly secured side plates 26 and 28 extending the full length of the unit, front plates 30 and 31 positioned below a chute 32, and a backplate 34 positioned generally opposite the plate 30 on the lower half of the unit. The side plates 26 and 28 are secured to support members 36 which rest upon the floor. The chute 32 is mounted on generally triangular shaped support members 38 secured to the front plate 30; and a double-acting double-ended pressure differential operated work push-off motor 40 is mounted on a crossbar 42 secured to two of the channel members 24. An elevator unit 44, including a channel shaped table 46, Figure 2, skirt members 48 and 50 on the sides and a front skirt member 52, is reciprocated up and down within the loader by means of a double-acting double-ended differential operated elevator motor 54 which is pivotally mounted at 56 upon a support 58. Brake guide members 59 are secured to plates 61 fastened to the table 46; however in their stead smaller diametered brakes guide members 63 may be provided. Only one pair of these guide members is incorporated in each loader unit. To piston 60 of the motor 54 there is connected a plunger member 62, Figure 2; and the cylinder 65 of said motor is pivotally connected, at 64, to the base plate 46 of the elevator. Guide rollers 66, detachably mounted on the side skirt members 48 and 50, contact one of the faces of the channel members 24, all as is disclosed in Figures 3 and 4.

As is disclosed in Figures 2 and 3, the chute 32 includes spaced apart angle irons 68, 69, 70 and 71 constituting supports for brake support roller members 72; and with the roller mechanism in operation the last few of these rollers, that is those immediately adjacent the elevator, are preferably continuously driven by a chain 74 which is driven by power means 76.

A plurality of rollers 78, preferably three in number and the tops of which are preferably flush with the table 46, are pivotally mounted on triangular shaped support members 80 secured to the front plate 30; and these three rollers lie in alignment with the chute rollers 72 and project through openings in the table 46. A leverlike escapement member 82, generally channel shaped in longitudinal section as is disclosed in Figure 2, is pivotally mounted at 84 to a bearing member 86 which is fixedly secured to the inner angle irons 69 and 70 as disclosed in Figure 3; and the upturned end 88 of this escapement member is biased upwardly by a spring 90 and moved downwardly, with a downward movement of the elevator, by a pin 92 secured to the base plate of said elevator. The pin 92, in the latter operation of the escapement member 82, strikes a bar 94 fixedly secured to one end of said member. The loader unit also includes generally triangular shaped support members 96, Figure 3, secured to the backplate 34, said members being recessed at 98, Figure 2, to receive spaced apart guide rails 100 and 102. The lowermost transversely extending part 104 of the carrier bar member 20, Figure 5, fits within these guide rails to guide the several carriers X and Y as they are moved around by the conveyor mechanism. As will be described hereinafter, a normally closed suitably mounted switch LS-4 operates to temporarily disable the operation of the loader if an approaching carrier tray to be loaded is already carrying a brake unit. In this disabling operation, the brake unit will strike an arm of the switch thereby moving said arm and opening the switch.

The electrical control means of the loader unit of our invention is disclosed, in the main, in Figures 9 and 10 of the drawings. This control means, the principal elements of which are mounted in a boxlike compartment attached to one of the sides of the loader unit, serves to control the operation of the work push-off and elevator pressure differential operated motors 40 and 54, respectively. Since the loader units are alike, the description of one of said loaders will suffice in this specification.

A transformer 106 constitutes the source of electricity for the loader control. The operation of the loader control will now be described and in doing so the construction and arrangement of the several parts of the same will be brought out. At this juncture it is to be remembered that in the particular embodiment of our invention disclosed in this specification the several carriers operate in a sequence of two; and there are eight different loaders; accordingly, four of these sequence operations are successively operable when the conveyor and loaders are in operation; and the same applies to the unloader mechanism to be described hereinafter.

Referring now to Figure 9 of the drawings, it is assumed that the loader A, Figures 1, 2 and 3, is set up electrically, pneumatically and mechanically; that is, the hereinafter described timers, switches, relays and counter of the electrical controls are correctly positioned and adjusted and the suitable pressure differential operated motors 40 and 54 and their valves are positioned correctly. In this setting up operation a counter mechanism T-1, T'-1 is, with the embodiment of our invention disclosed in the drawings, set at 2; a Run, Test switch RT is set in its Run position, a safety switch LS-8 is checked to make sure that it is closed by the positioning of a brake unit on the chute 32, Figure 2, and the hereinafter described carrier actuated limit switches LS-1 and LS-2, Figure 5, adjustably mounted on a bracket 107 secured to the track 10, are positioned so that the brake being loaded will be pushed onto the carrier tray when said carrier passes the loader. No claim is made to the counter mechanism of this application; for such mechanism is disclosed in the prior art and well known to those skilled in this art.

As to the operation of the controls, the attendant preferably first starts the conveyor in motion by means of a drive motor, not shown. A pneumatic timer TD-CMS is energized when this drive motor starts; and this is also true of the unloader mechanism to be described hereinafter there being one set of interlock contacts brought to each loader and unloader of the mechanism. Ten seconds after the conveyor starts and the pneumatic timer TD-CMS of the loader is energized, said timer operates to close its contacts thereby allowing the brakes to be loaded onto and removed from the passing carriers X and Y. The purpose of this time contact is to prevent the loading and unloading of a brake until the conveyor gets up to speed. This is necessary because the timing of the motors 40 and 54 of the loader unit is predicated upon a certain set conveyor speed. If the motors of the loader are operated before this conveyor speed is reached the timing of the mechanism would be incorrect.

The attendant then closes a switch RM, Figure 9, controlling a roller motor, not shown, to place the end five chute rollers 72 in motion, Figure 3, and he then closes the two parts of a start count switch CS. The latter operation serves to energize the coil of a relay CR-5 thereby closing its normally open switches CR-5a, CR-5b and CR-5c the switch CR-5b locking around the upper switch part of the start count switch CS. This makes possible a manual release of the start count switch without stopping the operation of the counter T-1, T'-1. The closing of the start count switch also energizes the clutch coil T-1 of the counter, the latter being held in by contacts L2,B of a switch T-1a. Now the circuit is set up and the counter is in its reset position.

With the counter set at 2, it will make up when the second electrical impulse is received by the count coil T'-1 from a limit switch LS-1. Therefore, if it is desired to load a tray of carrier X the closing of the limit switch LS-1 is, by virtue of its particular mounting on the bracket 107, so timed that the operation is effected the second time said switch is closed. Incidentally, the operation of the counter may at any time be stopped by the opening of a stop count switch SC.

Assuming the elevator to be in its upper position, the attendant then places two brake units L and M on a preloading station 108 of the chute 32, Figure 2; and with this operation brake unit M rolls down to the lower end of said station and unit L rolls down to close a limit switch LS-8 mounted on the side of the upper end of said station. The brake M is held in the station 108 by the then upturned end 88 of the escapement lever 82 said end being in this position by virtue of the operation of the spring 90. Then when the elevator comes down the pin 92 secured to the table 46 serves to rock the lever 82 clockwise thereby allowing the brake M to roll down and over the rollers 78 and onto the table 46; and the brake L rolls down to take the place of the brake M when the elevator goes up again. When the brake M rolls onto the table 46 it closes a limit switch LS-3 mounted on a plate 79 secured to the backplate 34; and the closing of this switch results in the energization of the coil of a relay CR-6, the normally open switch CR-6a of said relay locking around switch LS-3. Thus if brake M bounces back from switch LS-3 the circuit will be maintained.

Now with the brake M on the table 46, switch LS-3 closed or locked around by the closure of the relay switch CR-6a, and the switch LS-8 being closed by virtue of the presence of another brake on the preloading station, the coil of a relay CR-1 is energized and held closed by its normally open switch CR-1a. When relay CR-1 closes, its normally open switch CR-1b closes thereby energizing the solenoid S-1 of a pilot operated single solenoid four-way valve S-2, Figures 7 and 8; and when said solenoid is energized said valve operates to energize the motor 54 to lift the elevator 44 up to its uppermost position against a stop 112, Figure 2. This stop is adjustably mounted on the housing side plate 28 thereby providing means for positioning the brake to be unloaded opposite one of the trays of the two carriers X and Y; for its is to remembered that each of the loader units handles a particular type of brake, say a Ford brake, and this brake is to be loaded onto a certain tray of the carrier.

When the table 46 reaches its top position it closes a limit switch LS-5 preferably mounted on the bottom of the stop 112; and when switch LS-5 closes it energizes the coil of a relay CR-3. Normally open switch CR-3b of the latter relay locks around switch LS-5 to seal in the relay CR-3. Then when the counter counts out, that is when the carrier X closes switch LS-1 there results a closure of the switch T-1b, indicated by the numbers 3-1 in Figure 10, thereby energizing the pneumatic timer TD-1 and the instantaneous contacts TD-1a of this timer then close immediately. The timer switch TD-1b is at this time closed and preferably stays closed for two tenths of a second. The timer switches TD-1a and TD-1b being then closed indicating that the carrier X is in position to be loaded, safety switch LS-4 being then closed indicating there is no brake on the tray then opposite the latter, relay CR-3 being closed indicating that elevator table 46 with its brake is in position to be unloaded, and switch TD-CMS being closed indicating that the conveyor is up to speed the coil of a relay CR-2 is energized. A switch CR-2b of relay CR-2 by-passes, that is locks around the other switches immediately above it in Figure 9, thereby sealing in said relay; furthermore, a switch CR-2a of relay CR-2 closes thereby energizing a production counter S-5 and the valve operated solenoid S-3, Figure 7, of a pilot operated single solenoid four-way valve S-4, said valve serving to control the aforementioned so called push-off double-acting double-ended pressure differential operated motor 40. The motors 40 and 54 and their valves are preferably duplicates of each other and the motor 54 and its valve S-2 are described in detail hereinafter.

When the solenoid of the valve unit S-4 is energized the valve of said unit is operative to energize the motor 40 to push the brake M off of the table 46 and onto the tray of the carrier as the latter passes by the loader. At the end of the stroke of a plunger 67 of the motor 40 said plunger operates to close a limit switch LS-6 mounted on a crossbar 110, Figure 2. Now at this time a normally closed initially open limit switch LS-7, Figures 4 and 9, mounted on the side member 28 beneath the elevator table 46, is closed inasmuch as said switch automatically closes immediately after the table starts to rise. The switch LS-7 is preferably opened by an angularly shaped member 113, Figure 4, secured to the skirt member 48; and when the elevator reaches its lowermost position the member 113 strikes a pin 114 to open this switch. Now with the closing of switches LS-6 and LS-7 there results a closing of a reset relay CR-4; and the energization of the coil of this relay closes a switch CR-4d of said relay thereby locking in the switch LS-6. However, the principal function of the reset relay CR-4 is to reset the relays CR-1, CR-2, CR-3 and CR-6. Accordingly, when this is done, that is when these relays are deenergized, valves S-2 and S-4 and production counter S-5 are also de-energized. This causes the pushoff motor 40 to return to its off position and the elevator operating motor 54 to bring the table 46 down to its lowermost position; and it also causes the production counter S-5 to count one brake. It is also to be noted that the table 46 of the elevator in coming down actuates the escapement lever 82 rotating the same clockwise to roll another brake onto the table of the loader thus continuing the new loading cycle.

Figure 7:
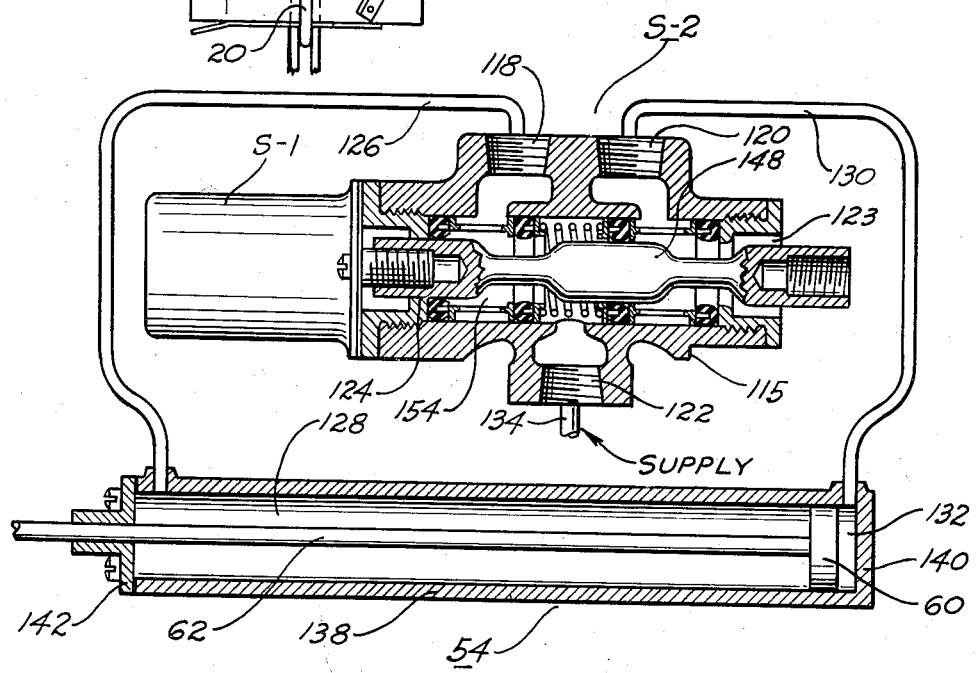
Figure 7 is a sectional view disclosing details of one of the double-acting motors of Figure 6 together with details of its control valve.

Describing now the details of the pilot operated single solenoid four-way valve S-2 disclosed in detail in Figures 6, 7 and 8, a three-part casing 115 is ported at 118, 120, 122, 123 and 124 to provide, respectively, a port connected, by a conduit 126, to a compartment 128 of the elevator motor 54, Figures 2 and 6, a port connected by a conduit 130 to a compartment 132 of said motor, a port connected, by a conduit 134 to a compressed air supply line 136, Figure 6, a port vented to the atmosphere, and lastly, another port vented to the atmosphere. An air lubricating unit 135, Figure 6, may be incorporated in the conduit 134 thereby insuring the desirable operation and life of the piston of the motor. The pushoff motor 40 of Figures 2 and 6 and its control valve S-4 are duplicates of the motor 54 and valve S-2, accordingly they will not be described here. As to the elevator motor 54, disclosed in detail in Figure 7 and to which no claim is made, a casing member 138 and end plates 140 and 142 together constitute the cylinder housing of the motor; and the piston 60 to which is connected the plunger 62 complete said motor.

Continuing now the description of the valve S-2, no claim to which is made, a reciprocable valve member 148 is moved to the right, to the position disclosed in Figure 7, by the armature 150 of the solenoid S-1. In this position the valve member, as is clearly disclosed in the latter figure, serves to interconnect the motor compartment 128 with the supply of compressed air and to vent the motor compartment 132 to the atmosphere; accordingly by this operation of the valve the motor 54 is energized to lift the elevator 44 to its uppermost position preparatory to pushing the brake unit off of the elevator and onto the carrier tray. Then when the solenoid S-1 is de-energized the compressed air in a compartment 154 of the valve operates to move the valve member to the left, Figure 7, to the position disclosed in Figure 8; and by this operation, as is clearly disclosed in Figure 8, the compartment 132 of the motor is connected to the source of compressed air and the compartment 128 of the motor is vented to the atmosphere. The motor 54 is then energized to return the elevator to its lowermost position, that is the position disclosed in full lines in Figure 2.

Unloader mechanism

Describing now the unloader mechanism of our invention, a description of one of the unloader units, for example unloader A', will suffice inasmuch as all of said units are alike. Referring to Figures 11 and 12, the structural features of the unloader A' include a boxlike support 156 housing a pilot operated single solenoid four-way control valve S-6. This valve, which duplicates the previously described valve S-2, serves to control a double-acting double-ended pressure differential operated motor 158 which is a duplicate of the previously described motors 40 and 54. An air lubricating unit 41, duplicating the previously described unit 135 may be incorporated in the air supply conduit, not shown, leading to the valve S-6. The motor 158 is mounted on a rectangular shaped plate 160 to which is secured a pin 162. This pin is journalled in a top member 164 of the unloader, and said pin is biased, by a torsion spring 166, to a position to maintain the motor in alignment with the trays 16 which pass by the motor. In this position the spring 166 has forced the motor into contact with a stop 167. The top member 164 is, at each of its four corners, mounted on posts 168 which are slidably and adjustably mounted in the corners of the support 156. The top member and motor are therefore, with the adjustment of said member, vertically adjustable with respect to the trays 16, the plunger 146 of the motor being correctly vertically positioned opposite the particular tray to be unloaded.

The yieldable mounting of the motor provides a safety feature inasmuch as should the plunger 146 fail to return to its off position after pushing a brake unit off of the tray, then, as is disclosed in Figure 12, the plunger would be caught by the bar 20 resulting in a tendency to bodily rotate the motor unit and bend said plunger. However, the rotatable mounting of the motor prevents this undesired operation of the mechanism, for with this mounting the motor will bodily rotate angularly about the longitudinal axis of the loader and the torsion spring 166, which is secured to the rotatable pin 162 and to the top member 164 will, after the bar 20 has cleared the plunger 146, then operate to return the motor to its normal position. The bar 20 is guided in its movement by guides 100' and 102' mounted in supports 96' secured to the support 156.

Describing now the control mechanism of the unloader unit A' practically all of said mechanism is electrical in character and is disclosed in the electrical hookup of Figures 13 and 14. Referring to Figure 13 the electrical controls of the unloader include a TD-CMS' conveyor interlock switch mechanism, switches LS-1' and LS-2', a two-part start count switch CS', a stop count switch SC' and a Run, Test switch mechanism W, all of which duplicate the same mechanism used in the loader unit A previously described. Accordingly after the elapse of a conveyor running time of say ten seconds the switch TD-CMS' is closed to make possible an operation of the unloader unit. There is also included in the unloader controls a transformer 169 and a normally closed safety switch LS-9 which is opened if and only if a brake receiving chute 170 is already filled; and the controls include a counter unit T-2, T-2' duplicating the operation of the previously described counter unit of the loader mechanism. As to the safety switch LS-9 and its operation, it is desirable, of course, to temporarily disable the unloader mechanism if the chute 170 is already filled with brakes.

The description of the parts of the electrical controls of the unloader are best described by a narration of the cycle of operation of this mechanism; accordingly this is given hereinafter. With the conveyor running up to speed and the unloader set up electrically, pneumatically and mechanically, that is the electrical controls in their off position, the switches LS-1' and LS-2' properly positioned, the switch LS-9 closed, the counter set at 2, a motor plunger P in its off position, and the motor 158 set at the desired height to effect its unloading operation, the attendant will depress the start count switch CS' just before a carrier Y passes the motor, that is assuming it is desired to unload a particular tray of the immediately following carrier X.

The closing of the switch CS' results in an energization of a relay coil CR-5', a pneumatic timer TD-3 and the clutch coil T-2 of the counter. The timer TD-3 is adjusted to hold in a period of one second. When the clutch coil of the counter is energized, its normally open switch T-1b' closes thereby effecting a lock around of the start count switch. The contacts of the switch T-1b' are indicated by L2',B' in Figures 13 and 14. The electrical circuit is now set up and operation of the counter is in its reset position. Now as the aforementioned carrier Y passes the motor 158 after the closure of the start count switch, it closes limit switches LS-1' and LS-2'. However, nothing happens inasmuch as the counter is set at 2; for it is the immediately following carrier X that is to be unloaded. Accordingly, when this carrier X closes the limit switch LS-1' the switch T-1b', comprising contacts L2',B', opens to energize the clutch coil T-2 of the counter; and switch contacts 3',1' of the then open but normally closed switch T-1a' are, by this operation, closed. The counter is now in the "off and timed out cycle."

Continuing the description of the unloading operation, a limit switch LS-4', mounted on a bracket 159, is then closed by being physically contacted by the brake to be unloaded; and this operation is effected simultaneously or substantially simultaneously with the closing of the limit switch LS-1'. The safety switch LS-9 is at the time closed; switch T-1a' of the counter clutch T-2 is, as described above, closed at this time; switch TD-3a of the pneumatic timer TD-3 is at the time closed inasmuch as said timer has been closed more than one second; and conveyor controlled switch TD-CMS' is at the time closed. Thus with these electrical switches closed a circuit is completed through the coil of a pneumatic timer TD-2.

When the timer TD-2 is closed its instantaneous switch TD-2b closes thereby energizing a solenoid S-7 of the solenoid valve S-6, Figure 11. This valve, which has previously been described, controls the motor 158; and the operation of said valve results in an energization of said motor to operate its plunger P to push the brake off of the tray and onto the chute 170. The parts of the unloader mechanism are so constructed, adjusted, and arranged that the plunger P performs this operation when the tray to be unloaded is opposite the plunger, the latter being thrust between the two stops 17.

Completing the description of the operation of the unloader mechanism of our invention, when the coil of timer TD-2 is energized the switches LS-4' and LS-9 are locked in by a timer switch TD-2a. The energization of the timer coil TD-2 also results in the closing of a switch TD-2c thereby energizing the solenoid S-8 of a production counter. The switch TD-2c stays closed a limited time, say three seconds, after the coil TD-2 has been de-energized; and this time factor prevents an error in counting which might otherwise be caused by a bouncing contact. The brake having been pushed off of the tray the continued movement of the latter and its hanger results in a closing of the switch LS-2' which, as previously described, is located beside the limit switch LS-1'. Accordingly very shortly after the carrier X closes switch LS-1', it closes the switch LS-2'; and when switch LS-2' is closed the counter is reset. With the latter operation the counter coils are energized and held in through the switch T-1b'; also switch T-1a' of the counter opens thereby dropping out the timer TD-2. This opens TD-2 controlled instantaneous switch TD-2b thereby de-energizing the solenoid S-7 of the valve S-6; and the latter operation, as previously described, results in a return operation of the plunger 146'. In this position of the parts we are again set up for counting and a repetition of the above described cycle of operations.

As with the corresponding counter of the loader mechanism, the counter T-2, T-2' of the unloader can be set up to unload every carrier, every second carrier, every third carrier or so on up to, say, every four hundredth carrier. Once the counters of the loader and unloader are set up, the counting continues even after the conveyor is stopped for a period of time.

Conclusion

There is thus provided an efficient and effective mechanism for transporting a plurality of different types of units, such as brakes, from one location to another said units being loaded by power operated means onto a conveyor in a certain sequence and unloaded by power means in the same sequence such that like units only are unloaded at a particular unloading station.

With the mechanism of our invention the number of loaders and corresponding unloaders in operation may be varied at will; the sequence of operations may be varied by varying the number of carriers in operation said number being a multiple of any one of a plurality of numbers; and each loader and unloader may be adjusted to handle any one of a plurality of brakes and cooperate with any one of a plurality of trays.

We claim:

1. A mechanism for loading a plurality of units onto and unloading said units from a powered conveyor system, said mechanism including an endless conveyor carrying a plurality of carrier units, each unit comprising a hanger and a multi-tray member secured thereto, a plurality of loader units mounted along the endless conveyor each of said loader units handling a certain type of article to be transported on a certain tray of the multi-tray member, and a plurality of corresponding unloader units mounted along the endless conveyor remote from the loader units, said loader and unloader units including control means actuated by the hangers for effecting an energization of the latter units.

2. A mechanism for, in a certain sequence, loading a plurality of different articles onto and then, in the same sequence, unloading said articles from a powered conveyor system, said mechanism including an endless conveyor carrying a plurality of carrier units the number of said units being a multiple of a certain number and each unit comprising a hanger and multi-tray member secured thereto, a plurality of loader units mounted along the conveyor system and operable, in the aforementioned sequence, to load said articles onto certain trays of the multi-tray members, and a plurality of corresponding unloader units also operable successively and mounted along the conveyor system, said loader and unloader units including control means actuated by the hangers for effecting an energization of the latter units.

3. A loader, conveyor, unloader mechanism for transporting a certain number of different types of products from one place to another, said mechanism comprising a conveyor mechanism including a number of carrier units said number being a multiple of a certain number each carrier unit including a hanger and a multi-tray member secured thereto, a loader mechanism comprising a plurality of loader units including control means cooperable with the hangers of the carrier units in loading onto the carrier units, in a certain sequence, the several types of products to be transported; and an unloader mechanism comprising a plurality of unloader units positioned remote from the loader units and including control means cooperable with the hangers of the conveyor units in unloading, in the aforementioned certain sequence, the aforementioned products.

4. A loader, conveyor, unloader mechanism for transporting a certain number of different types of products from one place to another, said mechanism comprising a power operated conveyor mechanism including a number of carrier units said number being a multiple of a certain number, a loader mechanism comprising a plurality of loader units cooperable with the carrier units in sequentially loading onto said units, and at certain heights, the several types of products to be transported; and an unloader mechanism comprising a plurality of power operated unloader units cooperable with the carrier units in unloading, in the aforementioned certain sequence and at the aforementioned different heights, the aforementioned products.

5. A loader, conveyor, unloader mechanism for conveying a certain number of different types of products from one place to another place said mechanism comprising a conveyor mechanism including a number of carrier units said number being a multiple of a certain number, a loader mechanism comprising a plurality of loader units cooperable with the carrier units, each loader unit being operative to load, at a certain height, certain of the carrier units with one of the several types of products to be conveyed, a corresponding number of unloader units cooperable with the carrier units in the operation of unloading the aforementioned products at the aforementioned certain heights, and means, including counter mechanisms, for controlling the loader units and unloader units to effect the aforementioned operations.

6. A loader, conveyor, unloader mechanism for conveying a certain number of different types of products from one place to another place said mechanism comprising a conveyor mechanism including a number of multi-tray carrier units said number being a multiple of a certain number, a loader mechanism comprising a plurality of loader units each loader unit being operative to load certain of the carrier units with at least one of the several types of products to be conveyed the mechanism being such that each type of product is positioned in the carrier at a certain height, and a corresponding number of unloader units cooperable with the carrier units and loader units in the operation of loading, then conveying, then unloading the aforementioned products, each type of product being unloaded at a certain height; together with cut-out means for momentarily rendering the loader units inoperative in their operation of loading the conveyor units, said cut-out means being rendered operative when and only when the conveyor unit approaching the loader unit is already loaded with one of the aforementioned products.

7. A mechanism for loading a plurality of different types of products onto and unloading said products from a powered conveyor system there being processed a plurality of units of each type of product, said mechanism including an endless conveyor carrying a certain number of multi-tray carrier units said number being a multiple of a certain number, a loader mechanism including a plurality of loader units including control means actuated by the carrier units each of said loader units handling one of the aforementioned types of product and operative to deposit said product at a certain height onto one of the trays of a carrier unit; and an unloader mechanism including a plurality of unloader units, each of said unloader units handling one of the aforementioned types of products and operative to displace said product, at a certain height, from a tray of a carrier unit, the parts of the entire mechanism being so constructed and arranged and so operative that the several types of products are loaded onto the conveyor units in a certain sequence and later unloaded from said conveyor units in the same sequence.

8. In a mechanism for unloading a plurality of workpieces from a conveyor, an endless power driven conveyor comprising a plurality of carrier units each including a plurality of trays mounted one over another, a plurality of unloader units each comprising a support mounted alongside the conveyor, a chute mounted alongside the conveyor and opposite the support, and a double-acting pressure differential operated motor mounted on the support and operable to move workpieces off of the carriers and onto the chute.

9. In a mechanism for unloading a plurality of workpieces from a conveyor, an endless power driven conveyor comprising a plurality of carrier units each including a plurality of trays mounted one over another, a plurality of unloader units each comprising a support mounted alongside the conveyor, a chute mounted alongside the conveyor and opposite the support, and a double-acting pressure differential operated motor mounted on the support and operable to move workpieces off of the carriers and onto the chute, together with electrical means for controlling the operation of the unloader units including a switch for each motor actuated by the carriers, and a chute mounted disabling switch for each unloader unit operable to temporarily cut the unloader unit out of operation if the chute is already filled with workpieces when the loaded carrier approaches the unloader unit.

10. The combination with a conveyor mechanism including a power driven endless chain having a plurality of spaced work carrying carrier units secured thereto, and a plurality of spaced loader units mounted alongside the chain, each unit including an elevator, a workpiece loading chute and two motors for actuating the elevator and pushing a workpiece off of the elevator and onto a carrier unit, of electropneumatic means for controlling the operation of the two motors comprising valve means, and electrical means for controlling the operation of said valve means including a counter unit, means for controlling the operation of the counter unit comprising a manually operated start count switch, a reset switch actuated by the carrier units and another switch actuated by the carrier units, and further including a switch actuated by a workpiece when the same moves onto the elevator, a switch actuated by a workpiece when the same is positioned at a certain place on the chute, a switch actuated by the elevator when it reaches a certain elevated position, a safety switch for temporarily disabling the mechanism if a carrier is already filled with a brake when it approaches the loader, a switch actuated by a part of the motor after a workpiece has been pushed onto a carrier, and a switch actuated by the elevator when it is lowered to its lowermost position.

11. The combination with a conveyor mechanism including a plurality of work carrying carriers and a plurality of spaced loader units positioned alongside the conveyor mechanism each of said units including an elevator, a chute, and two motors for operating the elevator and pushing a workpiece off of the elevator and onto a carrier, of electropneumatic means for controlling the operation of each loader unit including motor controlling valves and electrical means for controlling the operation of said valves comprising a counter unit and switch means cooperating therewith, said switch means being actuated by the carriers, the elevator, a part of one of the motors, and the workpieces being processed.

12. The combination with a conveyor mechanism including a plurality of work carrying carriers and a plurality of spaced unloader units positioned alongside said mechanism, each of said units including a support, a motor mounted on the support and a chute, of electropneumatic means for controlling the operation of each unloader unit including a motor controlling valve and electrical means for controlling the operation of said valve comprising a counter unit and switch means cooperating therewith, said switch means including a switch actuated by a workpiece carried by a carrier and two successively operable switches actuated by the carriers.

References Cited in the file of this patent
UNITED STATES PATENTS

| | | |
|---|---|---|
| 2,348,112 | DaCosta | May 2, 1944 |
| 2,377,848 | Bailey | June 12, 1945 |
| 2,546,374 | Rayburn et al. | Mar. 27, 1951 |
| 2,648,181 | Dalton | Aug. 11, 1953 |
| 2,667,260 | Pyles | Jan. 26, 1954 |
| 2,709,010 | Todd | May 24, 1955 |
| 2,726,751 | Levitt | Dec. 13, 1955 |
| 2,728,466 | Postlewaite et al. | Dec. 27, 1955 |
| 2,734,617 | Temple | Feb. 14, 1956 |